(12) United States Patent
Sher et al.

(10) Patent No.: US 12,196,153 B2
(45) Date of Patent: Jan. 14, 2025

(54) CATALYST MOUNTING IN INTERNAL COMBUSTION ENGINES

(71) Applicants: Ilai Sher, Beer-Sheeva (IL); HYDRO-JECT LLC, Beer-Sheeva (IL)

(72) Inventors: Ilai Sher, Beer-Sheeva (IL); Eran Sher, Beer-Sheeva (IL)

(73) Assignee: Hydro-Ject LLC, Wilmington, DE (US)

( * ) Notice: Subject to any disclaimer, the term of this patent is extended or adjusted under 35 U.S.C. 154(b) by 0 days.

(21) Appl. No.: 18/043,635

(22) PCT Filed: Sep. 1, 2021

(86) PCT No.: PCT/IB2021/057993
§ 371 (c)(1),
(2) Date: Mar. 1, 2023

(87) PCT Pub. No.: WO2022/049505
PCT Pub. Date: Mar. 10, 2022

(65) Prior Publication Data
US 2024/0247618 A1    Jul. 25, 2024

(30) Foreign Application Priority Data
Sep. 2, 2020   (GB) ..................................... 2013803

(51) Int. Cl.
*F02F 1/24*      (2006.01)
*F01N 3/28*      (2006.01)
(Continued)

(52) U.S. Cl.
CPC .................. *F02F 1/24* (2013.01); *F01N 3/28* (2013.01); *F02B 23/0603* (2013.01);
(Continued)

(58) Field of Classification Search
CPC .......... F02F 1/24; F01N 3/28; F02B 23/0603; F02M 25/03; F02M 61/14; F02M 2200/85; F02M 2700/4321
(Continued)

(56) References Cited

U.S. PATENT DOCUMENTS

| | | | |
|---|---|---|---|
| 1,336,392 A | 4/1920 | Smith | |
| 2,872,778 A | 2/1959 | Dane | |

(Continued)

FOREIGN PATENT DOCUMENTS

| | | |
|---|---|---|
| DE | 590890 C | 1/1934 |
| DE | 2612961 A1 | 10/1977 |

(Continued)

OTHER PUBLICATIONS

International Search Report and Written Opinion dated Nov. 22, 2021 for corresponding PCT Application No. PCT/IB2021/057993.

*Primary Examiner* — Hoang M Nguyen
(74) *Attorney, Agent, or Firm* — Miller Canfield

(57) ABSTRACT

An internal combustion engine injector mounting is configured to i) secure an injector (36) to an internal combustion engine body so that the injector can inject a heated aqueous fluid and a fuel into a combustion chamber of the internal combustion engine, and ii) hold a catalyst so that the heated aqueous fluid and fuel are injected into the combustion chamber by passing through the catalyst. The catalyst is contained within the mounting to protect against oxidation by combustion processes that, in use, take place in the combustion chamber.

16 Claims, 4 Drawing Sheets

(51) Int. Cl.
*F02B 23/06* (2006.01)
*F02M 25/03* (2006.01)
*F02M 61/14* (2006.01)

(52) U.S. Cl.
CPC ............ *F02M 25/03* (2013.01); *F02M 61/14* (2013.01); *F02M 2200/85* (2013.01); *F02M 2700/4321* (2013.01)

(58) Field of Classification Search
USPC .................................. 60/1 A, 294, DIG. 12
See application file for complete search history.

(56) References Cited

U.S. PATENT DOCUMENTS

| | | | |
|---|---|---|---|
| 2,979,043 A | | 4/1961 | Meurer et al. |
| 3,361,353 A | | 1/1968 | Millman |
| 3,608,660 A | | 9/1971 | Smith et al. |
| 3,815,555 A | | 6/1974 | Tubeuf |
| 3,946,711 A | | 3/1976 | Wigal |
| 3,969,899 A | | 7/1976 | Nakazawa et al. |
| 3,980,064 A | | 9/1976 | Ariga et al. |
| 4,148,701 A | | 4/1979 | Leach |
| 4,185,593 A | * | 1/1980 | McClure ............... F02B 47/02 123/3 |
| 4,380,970 A | | 4/1983 | Davis |
| 4,508,064 A | | 4/1985 | Watanabe |
| 4,530,317 A | | 7/1985 | Schutten |
| 4,742,964 A | * | 5/1988 | Ito ...................... F02M 51/0675 239/585.4 |
| 4,777,801 A | | 10/1988 | Porter |
| 5,085,176 A | * | 2/1992 | Brinkley, III ........... F02B 43/10 123/3 |
| 5,088,452 A | | 2/1992 | Iwaki et al. |
| 5,113,806 A | | 5/1992 | Rodart |
| 5,127,369 A | | 7/1992 | Goldshtik |
| 5,156,114 A | | 10/1992 | Gunnerman |
| 5,183,011 A | | 2/1993 | Fujii et al. |
| 5,237,964 A | | 8/1993 | Tomoiu |
| 5,305,714 A | | 4/1994 | Sekiguchi et al. |
| 5,307,772 A | | 5/1994 | Rao et al. |
| 5,647,734 A | | 7/1997 | Milleron |
| 5,713,202 A | | 2/1998 | Johnson |
| 6,112,522 A | | 9/2000 | Wright |
| 6,508,210 B2 | * | 1/2003 | Knowlton ........... H01M 8/0612 123/3 |
| 6,659,049 B2 | | 12/2003 | Zagaja et al. |
| 6,988,492 B2 | * | 1/2006 | Shetley ............... F02D 19/0694 123/527 |
| 7,191,738 B2 | | 3/2007 | Shkolnik |
| 8,985,065 B2 | | 3/2015 | Buchanan |
| 10,113,513 B2 | | 10/2018 | Sher |
| 10,119,497 B2 | | 11/2018 | Sher et al. |
| 10,508,617 B2 | | 12/2019 | Sher et al. |
| 2002/0168306 A1 | | 11/2002 | Gittleman |
| 2003/0056510 A1 | | 3/2003 | Ovshinsky et al. |
| 2004/0003781 A1 | | 1/2004 | Akihiro et al. |
| 2005/0166869 A1 | | 8/2005 | Shkolnik |
| 2006/0070587 A1 | | 4/2006 | Bhalsora et al. |
| 2006/0204799 A1 | | 9/2006 | Ishikawa et al. |
| 2008/0202449 A1 | | 8/2008 | Shimada et al. |
| 2008/0245318 A1 | | 10/2008 | Kuroki et al. |
| 2008/0271706 A1 | | 11/2008 | Sharpe |
| 2009/0088952 A1 | | 4/2009 | Cheiky |
| 2009/0180939 A1 | | 7/2009 | Hagen et al. |
| 2010/0183993 A1 | | 7/2010 | McAlister |
| 2010/0307431 A1 | | 12/2010 | Buchanan |
| 2011/0005473 A1 | | 1/2011 | Ishikawa et al. |
| 2011/0265736 A1 | | 11/2011 | Shimada et al. |
| 2013/0000596 A1 | | 1/2013 | Diaz Escano et al. |
| 2013/0311062 A1 | | 11/2013 | Skipp et al. |
| 2015/0040546 A1 | | 2/2015 | Buchanan |
| 2016/0061096 A1 | | 3/2016 | Loetz |
| 2016/0230653 A1 | | 8/2016 | Sher et al. |
| 2016/0230705 A1 | * | 8/2016 | Sher ...................... F02B 47/02 |

FOREIGN PATENT DOCUMENTS

| | | |
|---|---|---|
| DE | 19646754 A1 | 5/1998 |
| DE | 202004004502 U1 | 7/2004 |
| DE | 102005039296 A1 | 2/2007 |
| DE | 102008053774 A1 | 4/2010 |
| FR | 1011313 A | 6/1952 |
| FR | 2585769 A1 | 2/1987 |
| GB | 16711 | 8/1905 |
| GB | 20934 | 5/1911 |
| GB | 207811 A | 7/1924 |
| GB | 1191130 A | 5/1970 |
| GB | 1511863 A | 5/1978 |
| GB | 2394511 A | 4/2004 |
| JP | 2004251196 A | 9/2004 |
| JP | 2007120369 A | 5/2007 |
| JP | 2008014139 A | 1/2008 |
| JP | 2010037950 A | 2/2010 |
| NL | 1018858 C1 | 3/2003 |
| RU | 2042844 C1 | 8/1995 |
| WO | 2002020959 A2 | 3/2002 |
| WO | 2002055851 A1 | 7/2002 |
| WO | 2009101420 A1 | 8/2009 |
| WO | 2011025512 A1 | 3/2011 |
| WO | 2011028224 A2 | 3/2011 |

* cited by examiner 12,196,153 B2

CATALYST MOUNTING IN INTERNAL COMBUSTION ENGINES

CROSS REFERENCE TO RELATED APPLICATIONS

The present application is a 371 national stage patent application of PCT App. No. PCT/IB2021/057993, filed Sep. 1, 2021, which claims the filing benefits of GB Patent Application No. 2013803.8, filed Sep. 2, 2020, which are all hereby incorporated herein by reference in their entireties.

FIELD OF THE INVENTION

The invention relates to catalyst mounting in internal combustion engines and particularly, but not exclusively to internal combustions engines operating an engine cycle as disclosed in WO2015/040427 and WO2015/040428, the contents of which are incorporated herein by reference.

BACKGROUND TO THE INVENTION

It is known to provide a catalyst in a combustion chamber of an internal combustion engine to facilitate reactions in fluids injected into in the combustion chamber. Oxidation of such catalysts is a problem as oxidation of a catalyst may have a detrimental effect on the catalytic reaction performance.

SUMMARY OF THE INVENTION

The invention includes an internal combustion engine as specified in claim 1.

The invention provides an internal combustion engine injector mounting as specified in claim 10.

The invention also includes an internal combustion engine injector mounting as specified in claim 16.

BRIEF DESCRIPTION OF THE DRAWINGS

In order that the invention may be well understood, some examples thereof, which are given by way of example only, will now be described with reference to the drawings in which.

DETAILED DESCRIPTION

Figure 1:
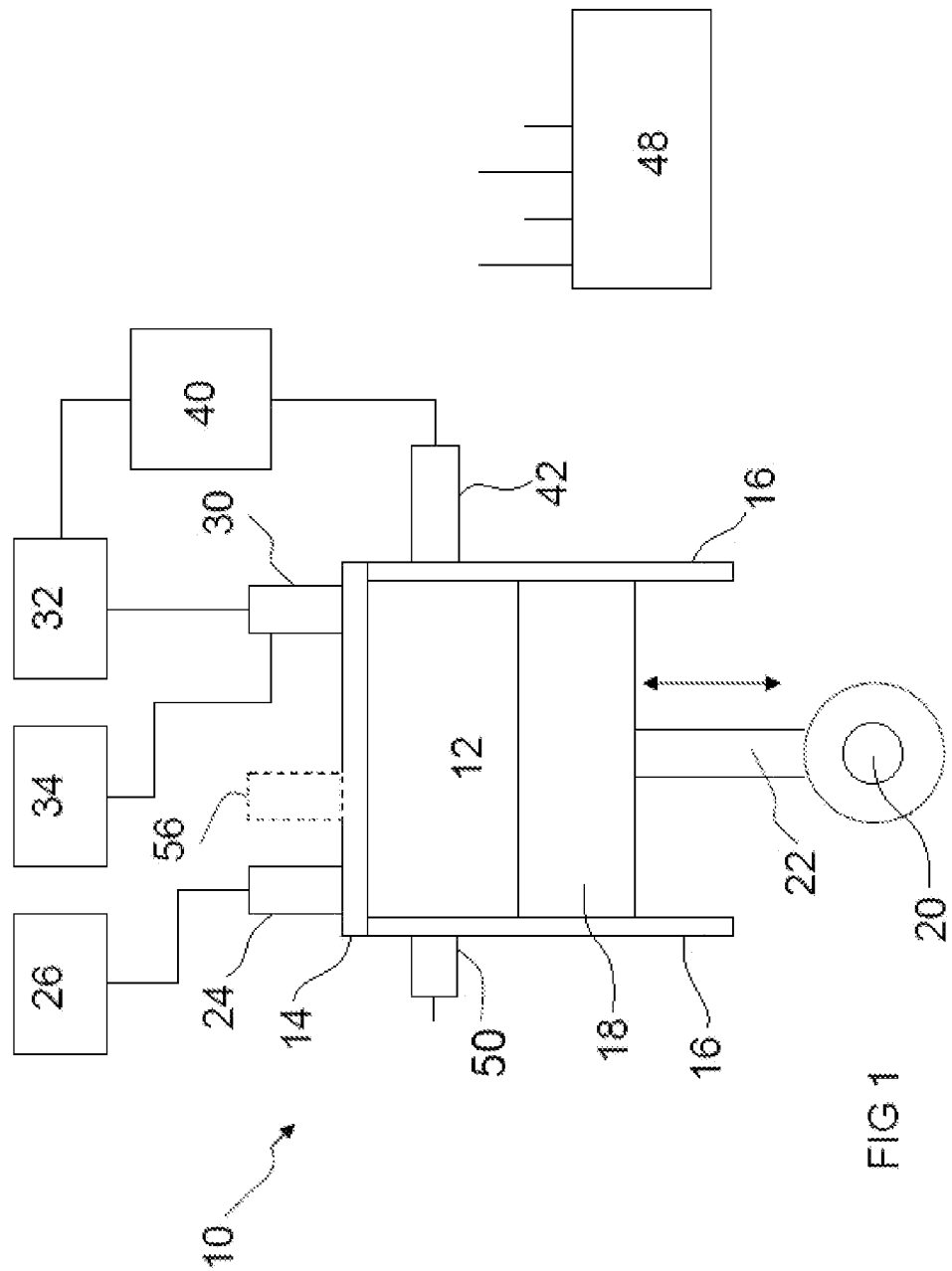
FIG. 1 is a schematic representation of an internal combustion engine.

Referring to FIG. 1, an internal combustion engine 10 comprises a variable volume combustion chamber 12 defined by a cylinder head 14, an engine block 16 and a body that is movable in a cylinder defined by the engine block. In the illustrated example, the body is a reciprocating piston 18 that is connected with a crankshaft 20 by a connecting rod 22. Although not essential, in the illustrated example, the combustion chamber is a single variable size volume bounded by the walls against which the piston seals, the piston head and the cylinder head 14.

The internal combustion engine 10 comprises first valving 24 operable to admit an intake gas comprising an aspirant into the combustion chamber 12. In the illustrated example, the intake gas is air received from an air supply system 26 connected with the first valving 24. The air supply system 26 may comprise a manifold configured to receive ambient air and conduct the air to the first valving 24. The first valving 24 may comprise one or a plurality of valves connected with the air supply system 26. The air supply system 26 may comprise suitable filters to clean the air. Although not essential, the intake air may be pressurised by turbo charging or supercharging, both of which are techniques that will be familiar to those in skilled in the art and so will not be described in detail herein.

Figure 2:
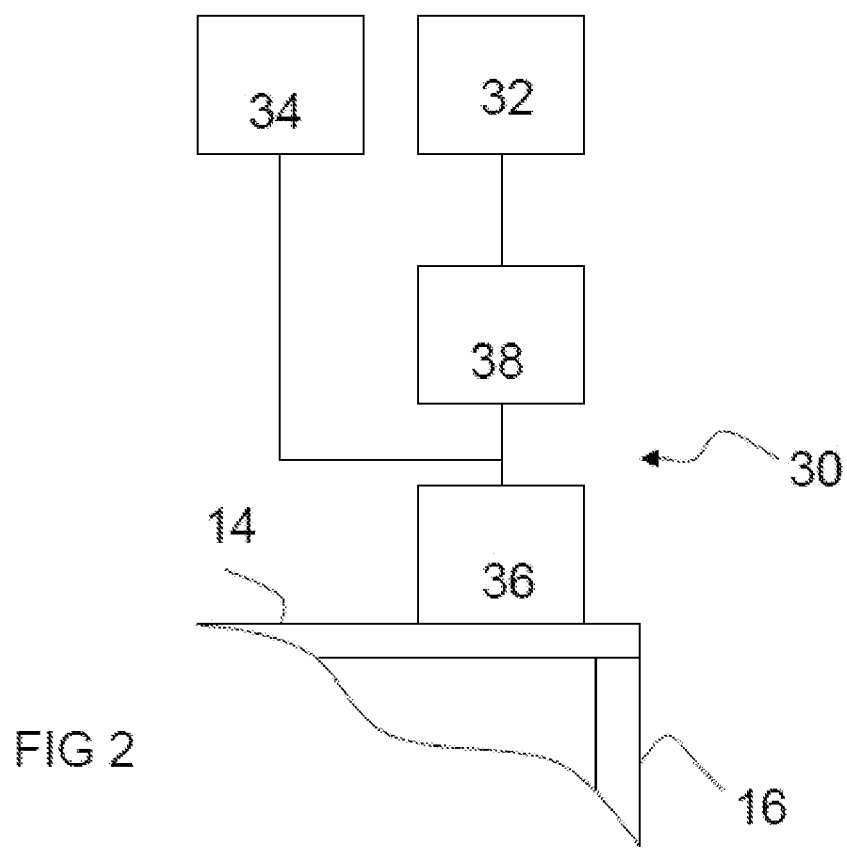
FIG. 2 is a schematic representation of an example of valving for the internal combustion engine of FIG. 1.

The internal combustion engine 10 comprises second valving 30 that is connected with an aqueous fluid supply system 32 and a reservoir 34 containing a fuel for the internal combustion engine. The second valving 30 is operable to admit heated aqueous fluid from the aqueous fluid supply system 32 and fuel from the reservoir 34 into the combustion chamber 12 as a mixture or blend. The heated aqueous fluid received from the aqueous fluid supply system comprises droplets, vapour or a combination thereof. Preferably, the heated aqueous fluid, or at least the major proportion thereof, is steam. As shown in FIG. 2, the second valving 30 may comprise one or a plurality of injectors 36 that are arranged to inject the aqueous fluid/fuel mixture into the combustion chamber 12 and one or more valves 38 disposed between the aqueous fluid supply system 32 and the injector or injectors 36 so as to isolate the injectors from the aqueous fluid supply system and permit it/them to admit fuel alone into the combustion chamber.

The internal combustion engine 10 is provided with an exhaust system 40 and exhaust valving 42 comprising at least one exhaust valve that is operable to release exhaust gases from the combustion chamber 12 into the exhaust system. In the illustrated example, the exhaust system 40 is cooperable with the aqueous fluid supply system 32 to extract heat from exhaust gases flowing in the exhaust system to provide heat used to heat the aqueous fluid that is supplied to the one or more injectors 36. This may, for example, be achieved by having piping through which the exhaust gases flow winding around a pipe or a vessel through which the aqueous fluid flows or flowing the exhaust gases through a vessel containing one or more steam pipes.

The internal combustion engine 10 comprises a controller 48 to control the operation of the first valving 24, second valving 30 and exhaust valving 42. In the illustrated example, the first valving 24, second valving 30 and exhaust valving 42 comprise electrically actuated valves, for example solenoid valves, that are opened and closed in response to electrical command signals issued by the controller 48. In other examples, at least one of the first valving 24, second valving 30 and exhaust valving 42 may include one or more valves that are hydraulically or pneumatically actuated in response to electrical command signals issued by the controller 48 to a source of hydraulic or pneumatic actuating fluid.

The internal combustion engine 10 further comprises one or more sensors 50 connected with the controller 48 to provide the controller with signals indicative of the pressure/temperature in the combustion chamber 12. The one or more sensors 50 may comprise a pressure sensor or a temperature sensor. The one or more sensors 50 may be any suitable type of sensor capable of operating at the relatively high temperatures that will be encountered in use of the internal combustion engine 10. For the purposes of controlling operation of the internal combustion engine 10, at least during some phases of its operation, a temperature sensor needs to be highly responsive to temperature changes taking place within the combustion chamber 12. Where one or more temperature sensors are used, an infrared temperature sensor that senses the temperature in the combustion chamber through a translucent window (not shown) may be used. Alternatively, for example, a high temperature embedded photodiode such as is disclosed in U.S. Pat. No. 5,659,133 (the content of which is incorporated herein by reference) may be used.

The internal combustion engine 10 may be provided with a combustion initiator 52 to assist in initiating combustion events in the combustion chamber 12. The combustion initiator 52 may be an electrical combustion initiator such as a glow plug, hot wire, spark plug or the like. The combustion initiator 52 may be connected directly or indirectly with the controller 48 so as to be actuable by the controller.

In FIG. 1, the connections between the controller 48 and the valving 24, 30, 42 and the one or more sensors 50 are not shown. This is simply for the sake of clarity of illustration and the skilled person will have no difficulty in envisaging suitable ways and means for making the connections.

In FIG. 1, the internal combustion engine 10 is shown comprising just one combustion chamber 12. While this may be appropriate for some applications, typically the internal combustion engine 10 will comprise a plurality of combustion chambers 12, each having a piston 18 connected to the crankshaft 20. In a multiple chamber, or cylinder, engine, the chambers may be arranged in any suitable known configuration such as in-line, flat or a V.

Figure 3:
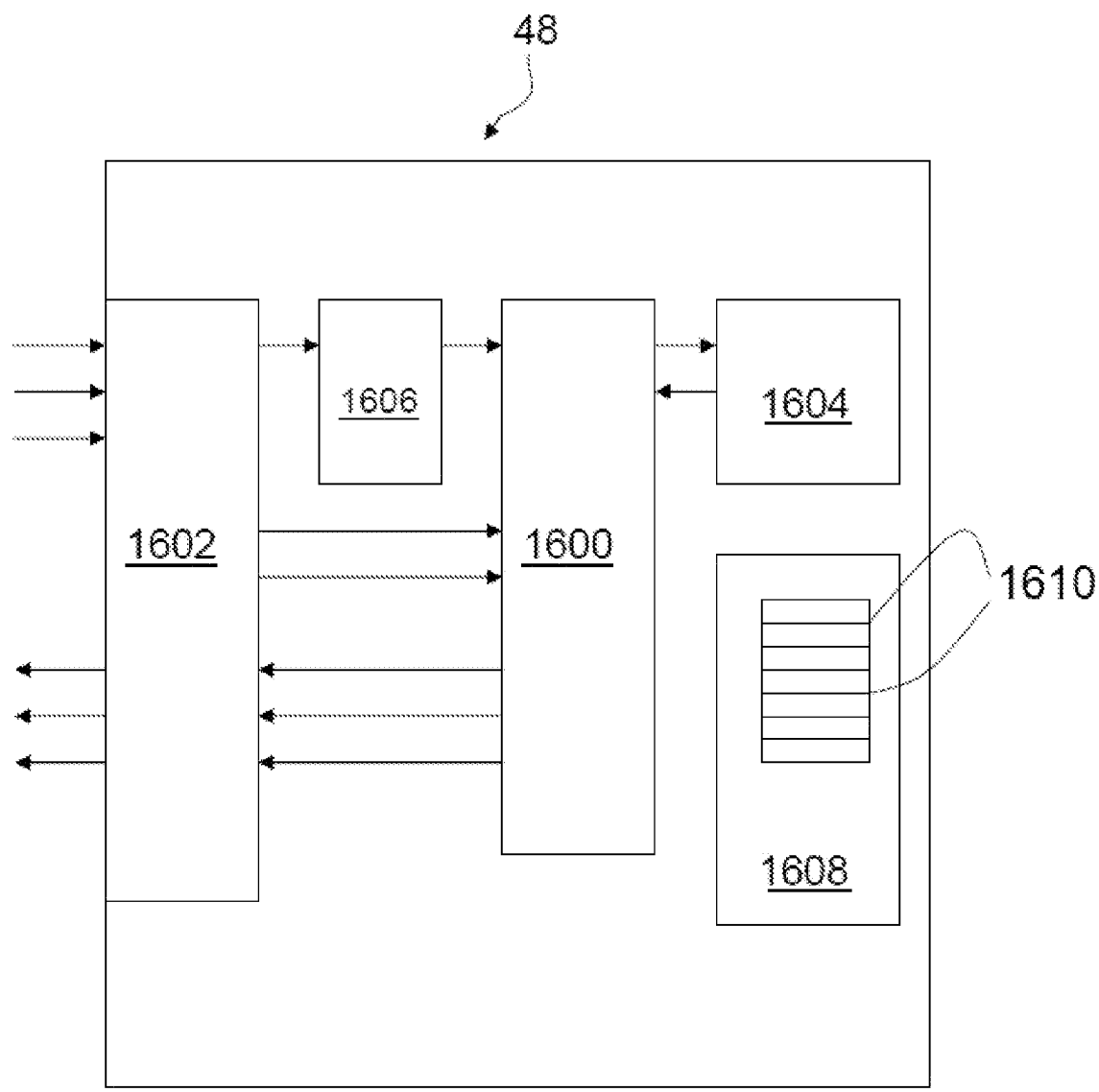
FIG. 3 is a schematic representation of an example of a controller for the internal combustion engine of FIG. 1.

Referring to FIG. 3, a suitable controller 48 for the internal combustion engine 10 may comprise one or more processors 1600 and signal conditioning components 1602. The signal conditioning components 1602 may, for example, be configured to amplify signals output to the first valving 24, second valving 30, exhaust valving 42, the one or more sensors 50 or the combustion initiator 52, and/or convert analogue signals to digital and digital signals to analogue to permit the controller 48 to receive and use signals from the one or more sensors 50 and output usable signals to the valving 24, 30, 42 and other components of the internal combustion engine 10 that may be controlled by the controller. The controller 48 may additionally comprise one or more random access memories (RAM) 1604 for storing data generated during operation of the internal combustion engine and circuitry 1606 for use in sampling incoming signals from the one or more sensors 50 to provide a usable input for the one or more processors 1600. The controller 48 may additionally comprise one or more data storage components in the form of permanent memory 1608, which may be a read only memory (ROM), in which one or more control software portions 1610 are permanently stored. Of course, for some applications, no permanent memory is required. For example, the controller 48 may be connected with a master computer in which the control algorithms are stored and which uploads them to a RAM in the controller at start-up of the controller. Another alternative would be for the controller to be slaved to a master controller or computer. Yet another alternative would be for the controller 48 to comprise one or more hard wired control circuits.

Figure 4:
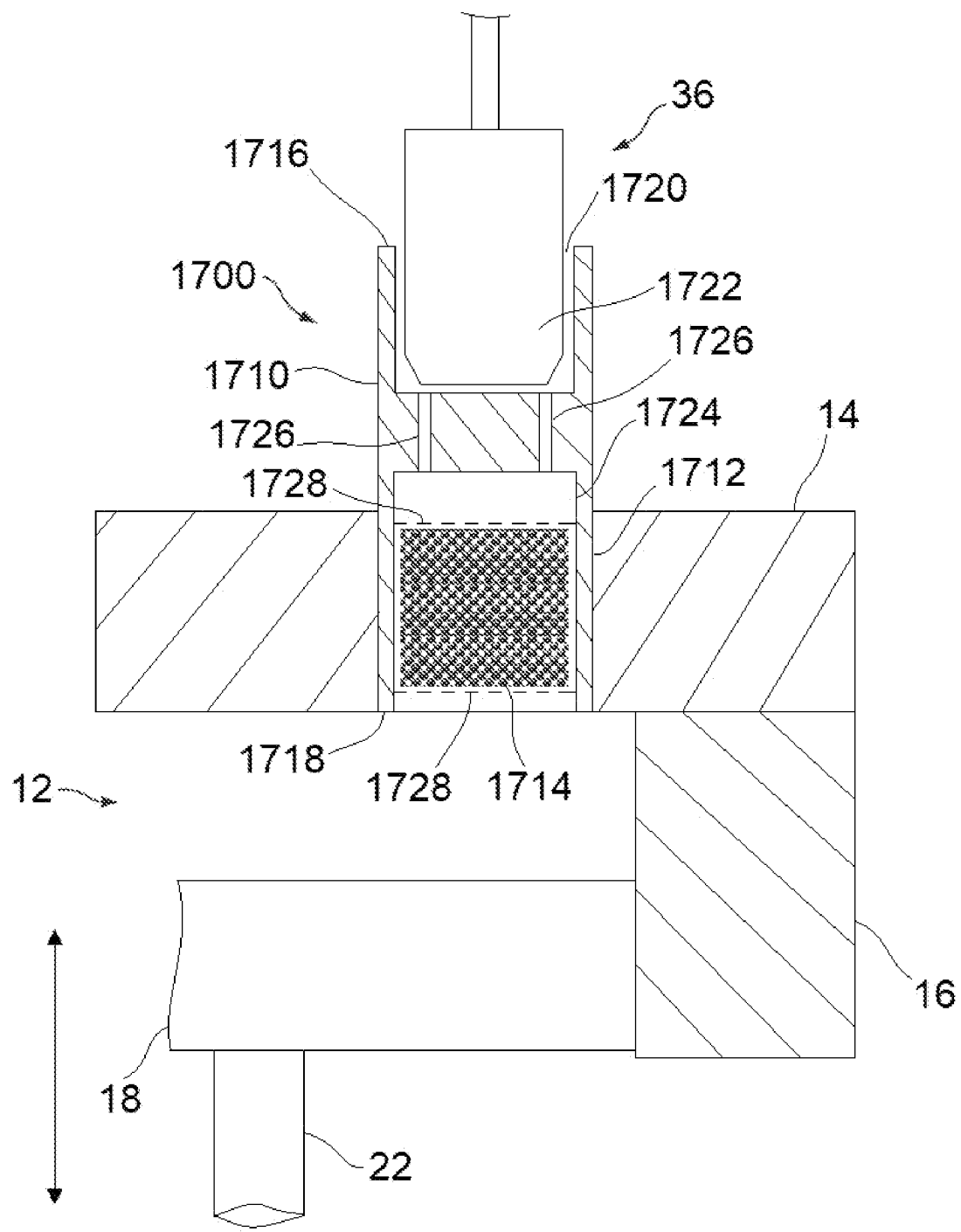
FIG. 4 is a schematic representation of an injector and an injector mounting of the internal combustion engine of the valving of FIG. 2

Referring to FIG. 4, an injector 36 is shown mounted in an injector mounting 1700. The injector mounting 1700 comprises a mounting body 1710 fitted to an aperture 1712 provided in the cylinder head 14 and a catalyst 1714. The mounting body 1700 has an upstream end 1716 and a downstream end 1718. The upstream end 1716 is provided with an injector recess 1720 to receive at least an outlet end 1722 of the injector 36. The injector 36 may be secured to the mounting body 1710 by any suitable known means for securing injectors to internal combustion engines.

The downstream end 1718 of the mounting body 1710 is provided with a catalyst holding space 1724 in which the catalyst 1714 is held. The mounting body 1710 is provided with at least one connecting passage 1726, or leading duct, extending between the injector recess 1720 and the holding space 1724 so that, in use, fluid output from the outlet end 1722 of the injector 36 can pass into the combustion chamber 12 via the holding space 1724. There may be one relatively large diameter/width connecting passage 1726 or a plurality of relatively smaller diameter/narrow connecting passages. Having a plurality of relatively small diameter/narrow connecting passages 1726 may enable evaporation of the fluid output by the injector 36 before it reaches the catalyst 1714 contained in the holding space 1724.

The holding space 1724 is defined by a recess provided at the downstream end 1718 of the mounting body 1710 and at least one porous retaining member 1728 provided in the recess to retain the catalyst 1714 in the catalyst holding space 1724. In the illustrated example, there are two porous retaining members 1728 disposed in opposed spaced apart relationship and the catalyst 1714 is held between them. The porous retaining members 1728 may comprise drilled, punched or otherwise perforated metallic sheets or a metallic mesh.

The injector mounting 1700 is provided with means by which it may be secured to the cylinder head 14. For example, the downstream end 1718 of the mounting body 1710 may be provided with a fastening element by which it can be secured to the cylinder head 14. The fastening element may comprise an external screw thread that is engageable with an internal screw thread provided in the aperture 1712. In some examples, the mounting body 1710 may be provided with a groove or slot that is engageable by a fixing plate that may be screwed to the cylinder head 14.

Preferably, the mounting body 1700 is configured such that at least the portion thereof that contains the catalyst 1714 is housed within the cylinder head 14. Thus, the sidewall of the mounting body 1700 where it surrounds the catalyst 1714 is at least substantially disposed within the cylinder head 14. At least where it contains the catalyst 1714, the mounting body 1700 is in intimate contact with the cylinder head 14 to facilitate the conduction of heat from the cylinder head into the mounting body. A heat conducting paste may be provided between the mounting body 1700 and cylinder head 14.

The mounting body 1710 is made of a metal that is a good heat conductor and may, for example, be made of the same metal as the cylinder head 14. In some examples, the mounting body 1710 may be made of one of the following metals:

| Metal | Thermal Conductivity W/m · K |
|---|---|
| Brass | 150 |
| Tungsten | 174 |
| Aluminium | 237 |
| Copper | 386 |

In use, a fuel and aqueous fluid are supplied to the injector 36 from the aqueous fluid supply system 32 and the reservoir 34. The blend or mixture of aqueous fluid and fuel supplied from the injector 36 passes through the connecting passages 1726 and into the holding space 1724. The blend may be at least partially vapourised in the connecting passages 1726 and absorbs heat from the cylinder head 14 via the mounting body 1710. The heat from the cylinder head 14 absorbed by the aqueous fluid/fuel mixture in the holding space 1724 in the presence of the catalyst 1714 causes a steam reformation process by which hydrogen is separated from at least one of the fuel and the aqueous fluid.

In some examples, the fuel supplied to the injector 36 is selected to facilitate steam reformation and a different fuel may be supplied to the combustion chamber 12 for the main combustion event in each cycle. In such examples, the different fuel may be supplied through a separate dedicated injector or injectors.

Housing the catalyst 1714 in a holding space 1724 outside of the combustion chamber 12 may protect the catalyst 1714 and the reaction it promotes or enhances from oxidation due to exposure to oxygen. The heat that is required to be absorbed by the catalytic reaction, and by the evaporation process, is mainly absorbed through the cylinder head 14 that is connected to the mounting body 1710. This may reduce the cooling requirement for the cylinder head and improve the overall thermal efficiency of the engine by reusing heat that would otherwise be conducted away from the combustion chamber 12 or cylinder head 14 by the coolant flow.

The tables below show some possible desired relative properties of a mounting body such as the mounting body 1710 shown in FIG. 4.

| Data and basic calculations | | Units | | |
| --- | --- | --- | --- | --- |
| Mass of MeOH and H$_2$O blend each cycle | mg | 15 | kg | 1.50E−05 |
| MeOH/H$_2$O volumetric ratio | | | | 0.50 |
| Blend molecular weight | | | kg/kmol | 22.67 |
| Liquid density | | | kg/m$^3$ | 900 |
| Injection pressure | Bar | 200 | kPa | 20,000 |
| Engine compression ratio | | | | 18 |
| Cylinder pressure at TC (back pressure) | | | kPa | 5,777 |
| Cylinder temperature at TC | | | K | 953 |
| Vapor density | | | kg/m$^3$ | 16.52 |
| Vapor volume each cycle | mm$^3$ | 908 | m$^3$ | 9.08E−07 |
| Box space and leading duct fraction needed | | 0.25 | | |

| Basic data | Units | |
| --- | --- | --- |
| MeOH molecular weight | kg/kmol | 32 |
| H$_2$O molecular weight | kg/kmol | 18 |
| k (air) | | 1.4 |
| R blend (calculated) | kJ/kg*K | 0.367 |
| Ambient pressure | kPa | 101 |
| Ambient temperature | K | 300 |

| Design | Units | | V |
| --- | --- | --- | --- |
| In-box to leading duct ratio | | 0.50 | |
| Catalyst in-box volume (holding space) | mm$^3$ | 113 | |
| Catalyst in-box volume (inc catalyst balls) | mm$^3$ | 227 | 226 |
| Length/diameter ratio of the catalyst box | | 2 | |
| In-box diameter | mm | 5.2 | |
| In-box length | mm | 10.5 | |
| Leading duct internal volume | mm$^3$ | 113 | |
| Leading duct internal length | mm | 40 | |
| Leading duct internal diameter | mm | 1.90 | |

It is to be understood that although the injector mounting 1700 has been described in connection with a reciprocating piston internal combustion engine, the concept may also be applied to Wankel engines.

It will be understood that by providing the catalyst in an injector mounting such as the injector mounting 1700, it is possible to retrofit to existing engines and allow the operation of an engine cycle that includes the production of hydrogen by steam reformation in legacy engines not designed for onboard hydrogen production. For example, the injector mounting 1700 may be configured to fit in an opening in a cylinder head that has been configured to receive a conventional injector and secured to the cylinder head by the same means as the conventional injector.

The invention claimed is:

1. An internal combustion engine comprising:
an engine body defining a space in which a movable body moves to define a variable volume combustion chamber;
an injector mounting body defining a catalyst holding space and being secured in an aperture that is provided in said engine body thereby positioning said catalyst holding space substantially, externally to said variable volume combustion chamber;
an injector mounted in said injector mounting body and connected with a fuel supply and an aqueous fluid supply; and
a catalyst disposed in a catalyst holding space defined in said injector mounting body thereby subjecting the aqueous fluid received from said injector to a catalytic reaction thereby generating hydrogen products in said catalyst holding space and passing the hydrogen products produced from the catalytic reaction into said variable volume combustion chamber.

2. The internal combustion engine as claimed in claim 1, wherein said injector mounting body defines an injector recess to receive at least an output end of said injector and at least one connecting passage connecting said injector recess with said catalyst holding space.

3. The internal combustion engine as claimed in claim 2, wherein said catalyst holding space is defined by a recess defined by said injector mounting body and at least one porous retaining member is provided in said recess to retain the catalyst in said catalyst holding space.

4. The internal combustion engine as claimed in claim 1 wherein said injector mounting body is provided with a fastening element by which said injector mounting body is fastened to said engine body.

5. The internal combustion engine claimed in claim 4, wherein said fastening element comprises an external screw thread.

6. The internal combustion engine claimed in claim 1, wherein said injector mounting body is made of a metal having a heat conductivity of at least 150 W/m·K.

7. The internal combustion engine claimed in claim 1, wherein said catalyst holding space is disposed within said aperture.

8. The internal combustion engine claimed in claim 1, wherein a sidewall of at least a portion of said injector mounting body that contains said catalyst holding space engages a wall of said engine body that defines said aperture.

9. The internal combustion engine claimed in claim 1, wherein a downstream end of said injector mounting body is disposed in said aperture externally of said variable volume combustion chamber.

10. An internal combustion engine injector mounting comprising:

a mounting body interconnected to an aperture in an internal combustion engine cylinder head that partially defines a combustion chamber;

said mounting body includes an upstream end and a downstream end, and said upstream end being provided with an injector recess to receive at least an outlet end of an injector;

said downstream end being provided with a catalyst holding space including a catalyst disposed therein and being located external to said combustion chamber; and said mounting body being provided with a connecting passage extending between said injector recess and said catalyst holding space for providing an aqueous solution to said catalyst thereby enabling said catalyst to initiate a catalytic reaction externally of said combustion chamber.

11. The internal combustion engine injector mounting claimed in claim 10, wherein said catalyst holding space is defined by a recess provided at said downstream end and at least one porous retaining member is provided in said recess to retain the catalyst in said catalyst holding space.

12. The internal combustion engine injector mounting claimed in claim 10, wherein said downstream end of said mounting body is provided with a fastening element to fasten said mounting body to said cylinder head.

13. The internal combustion engine injector mounting claimed in claim 12, wherein said fastening element comprises an external screw thread.

14. The internal combustion engine injector mounting claimed in claim 10, wherein said mounting body is made of a metal having a heat conductivity of at least 150 W/m·K.

15. An internal combustion engine comprising:

a cylinder head that partially defines a combustion chamber;

being fitted with an injector mounting that comprises a mounting body fitted to an aperture defined by said cylinder head;

said mounting body an upstream end and a downstream end, and wherein said upstream end is provided with an injector recess to receive at least an outlet end of an injector;

a catalyst holding space for holding a catalyst and being disposed at said downstream end of said mounting body; and said mounting body being provided with a connecting passage extending between said injector recess and said catalyst holding space for providing an aqueous solution to said catalyst thereby enabling said catalyst to initiate a catalytic reaction externally of said combustion chamber.

16. The internal combustion engine claimed in claim 15, further comprising said catalyst holding space including at least one porous retainer through which hydrogen can pass from said catalyst holding space to said combustion chamber.

* * * * *